Dec. 27, 1927.
H. SAUVEUR ET AL
1,653,785
COMPRESSED AIR BRAKE APPARATUS FOR MOTOR VEHICLES
Filed Feb. 1, 1924   9 Sheets-Sheet 1
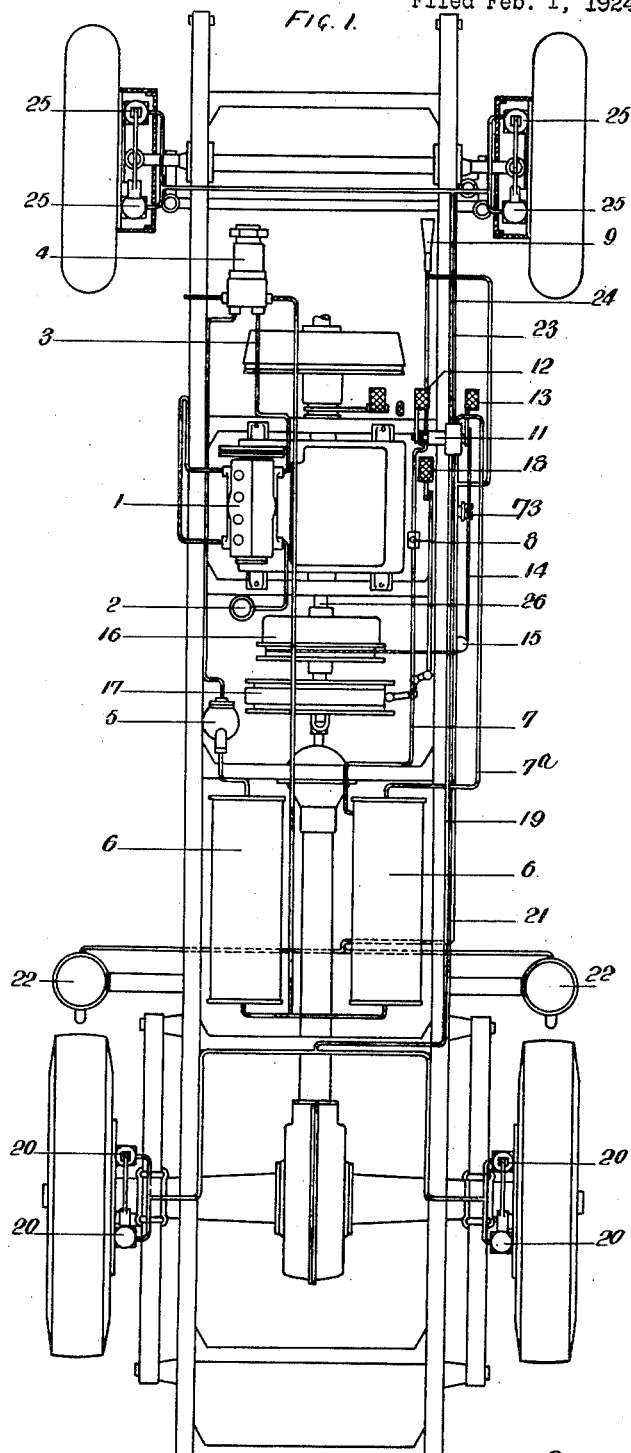
Inventors
Harry Sauveur
Theodor Kollinek
By Cushman Bryant & Carby
Attorneys

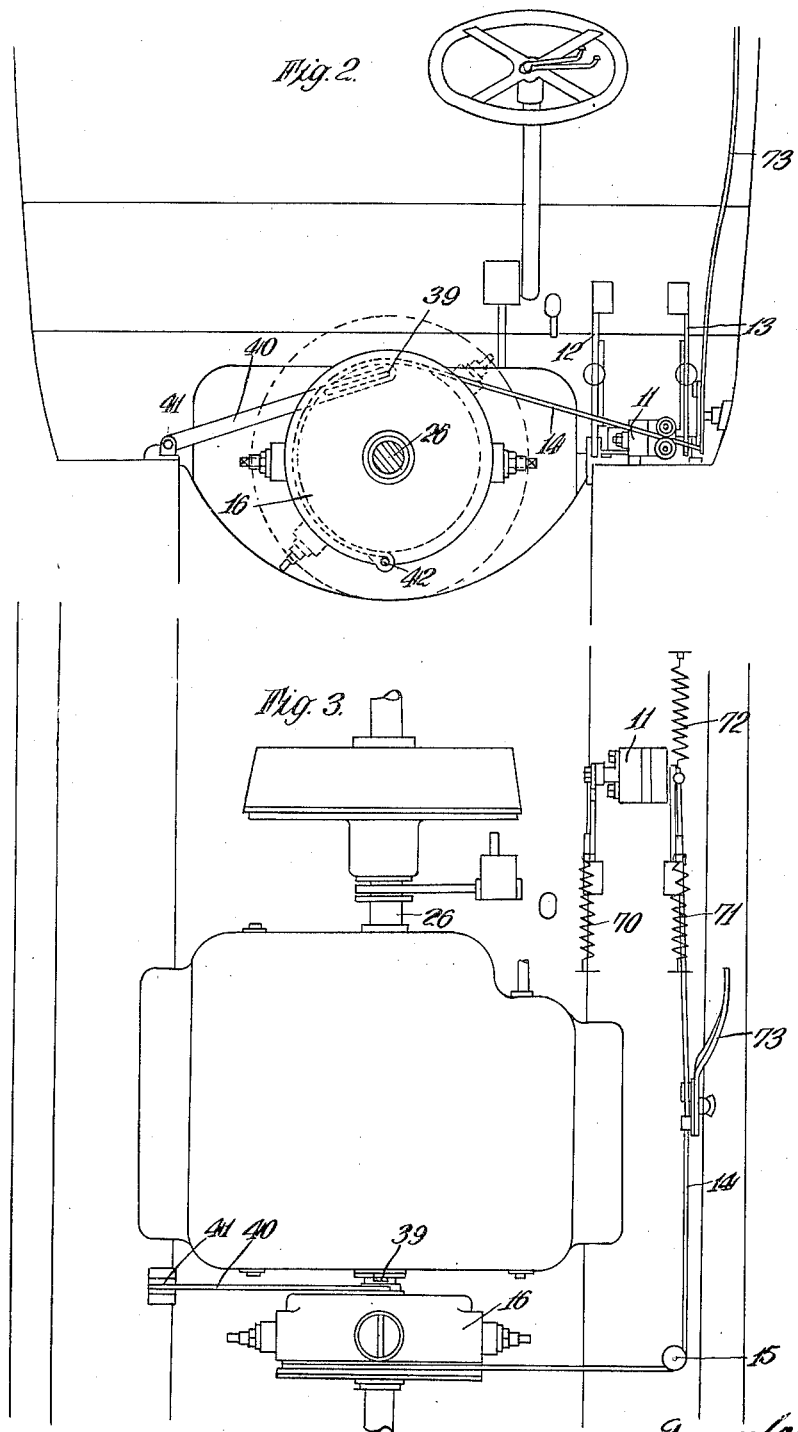

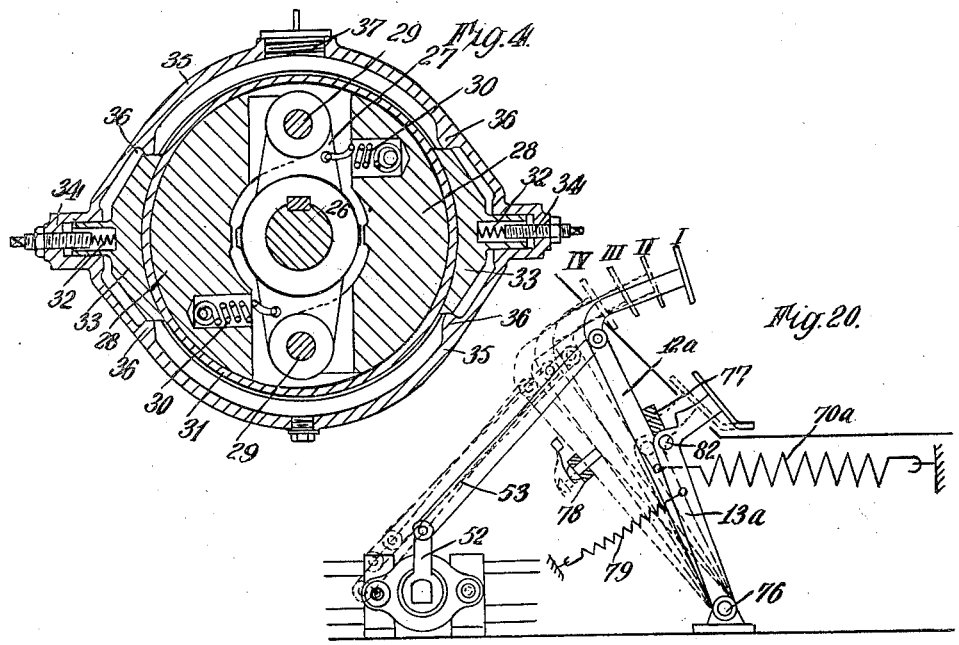

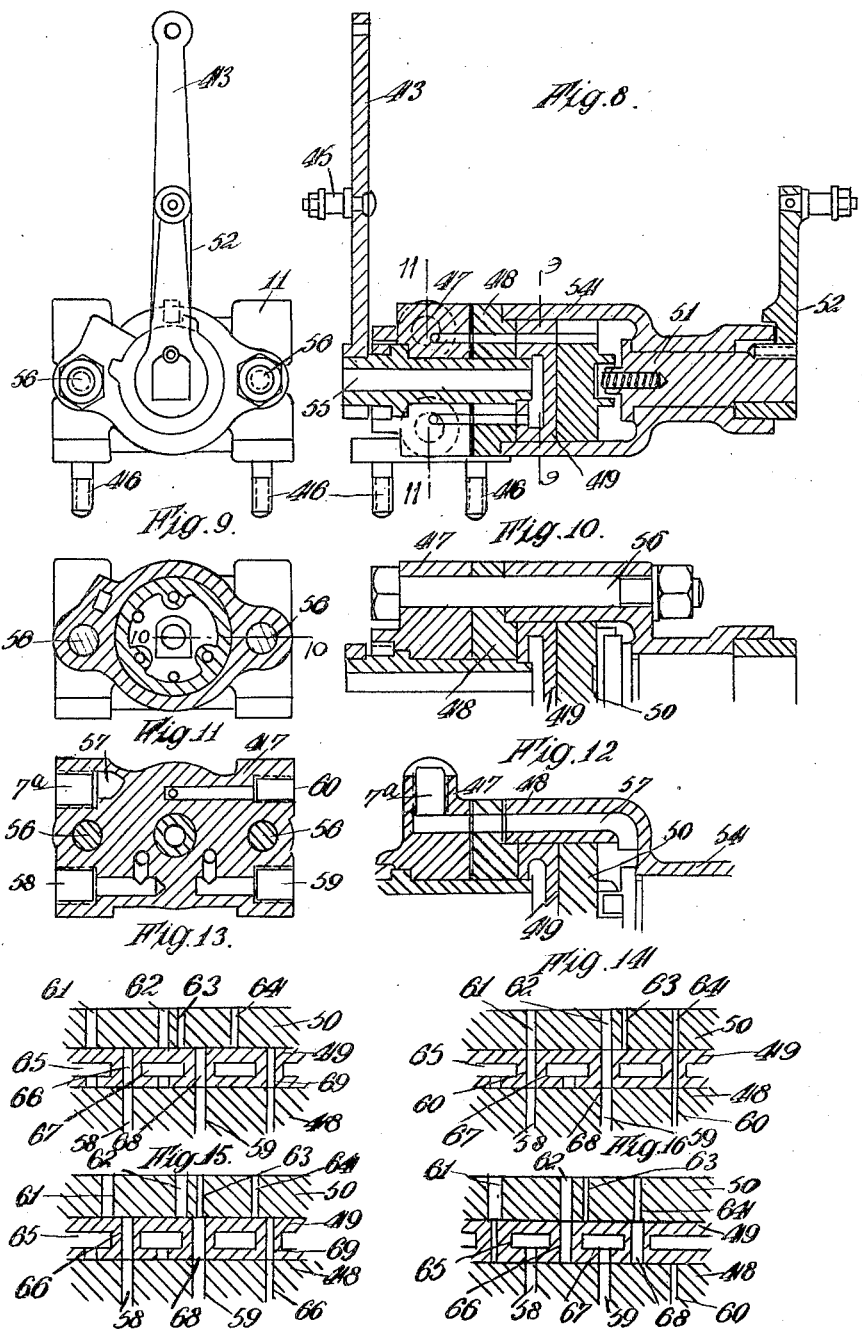

Dec. 27, 1927.
H. SAUVEUR ET AL
1,653,785
COMPRESSED AIR BRAKE APPARATUS FOR MOTOR VEHICLES
Filed Feb. 1, 1924
9 Sheets-Sheet 5
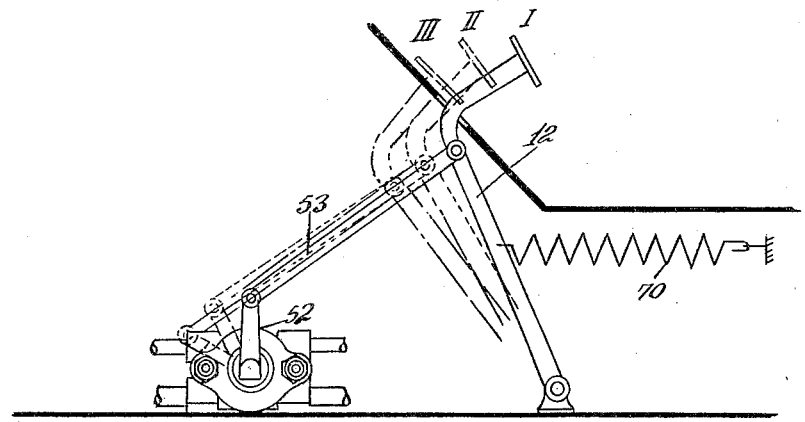
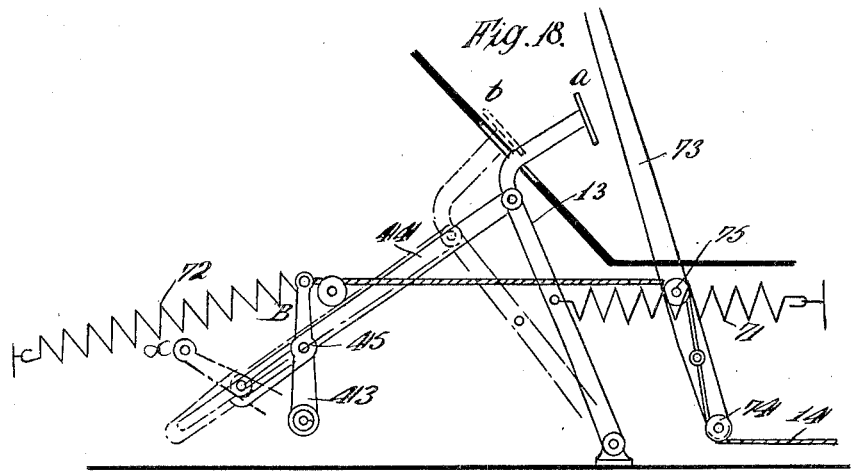
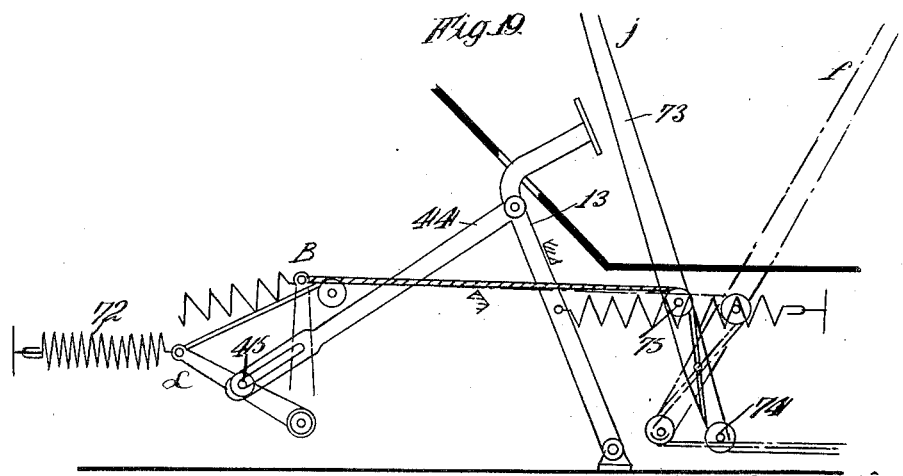

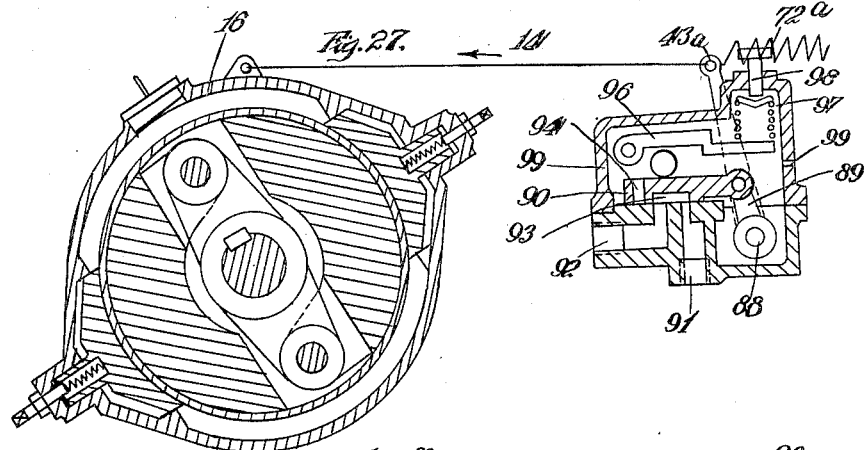
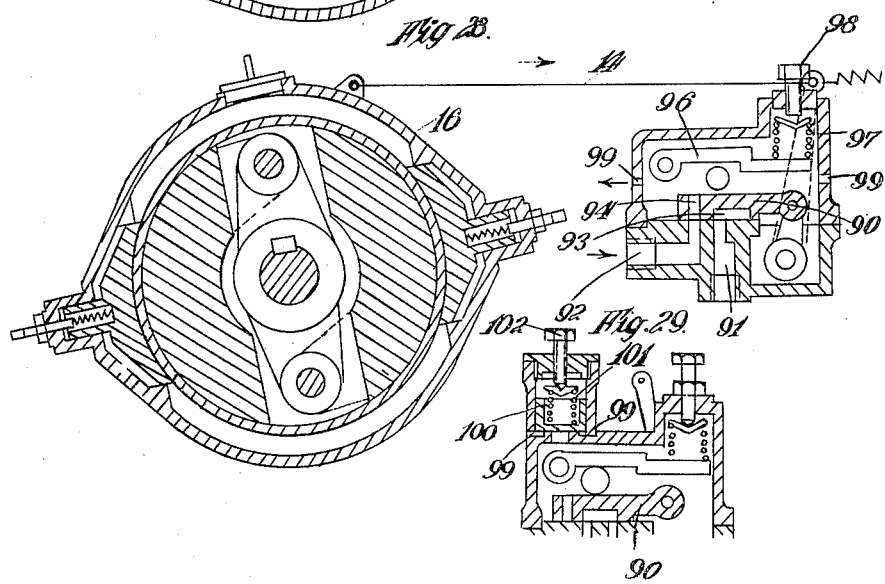
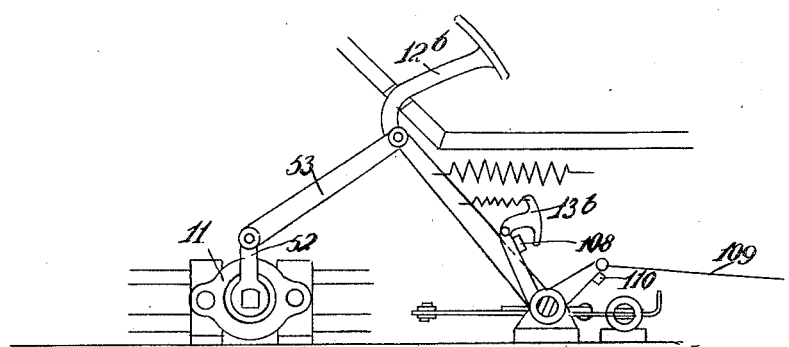

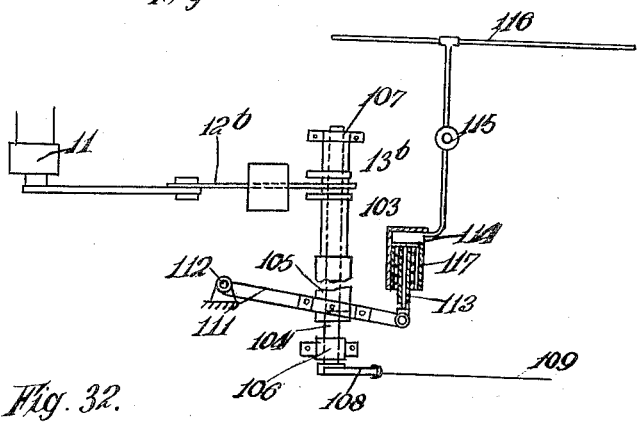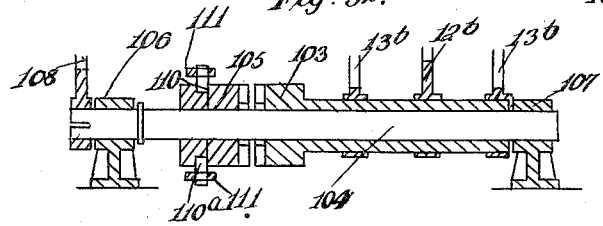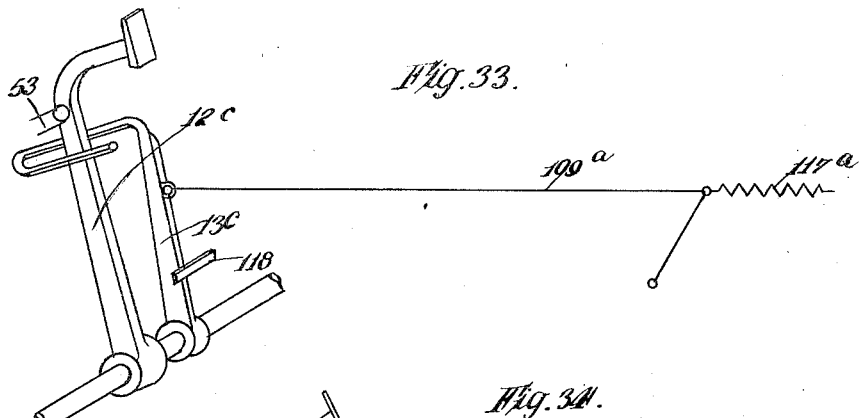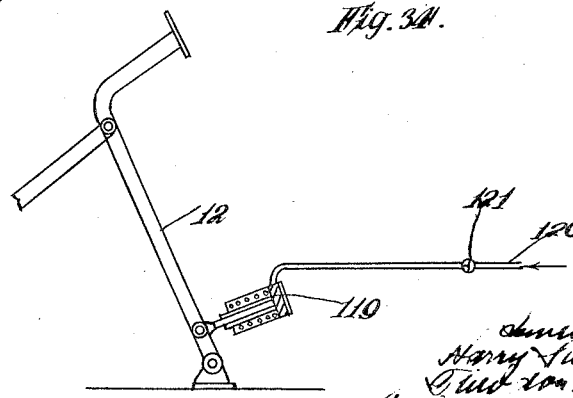

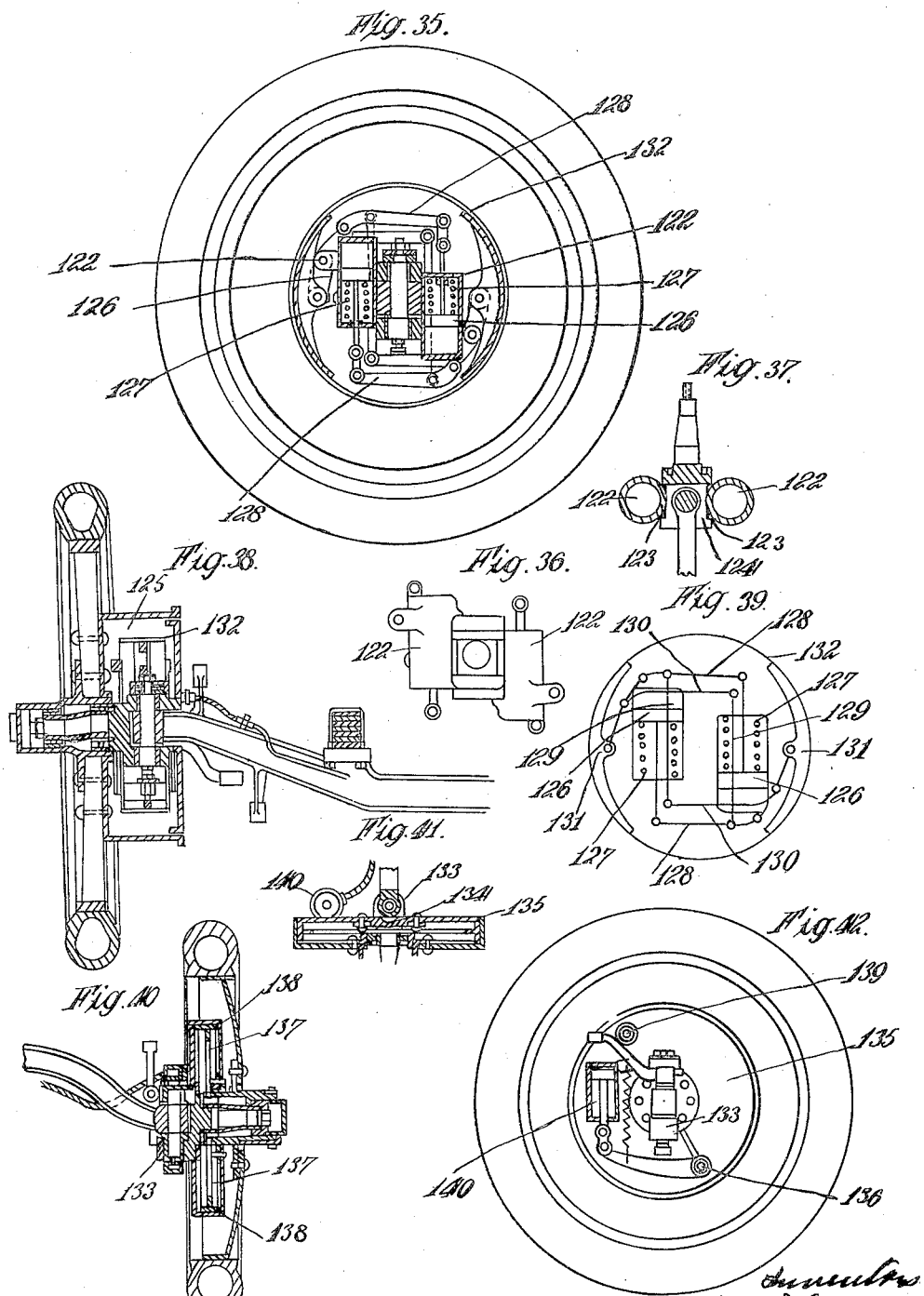

Dec. 27, 1927. 1,653,785
H. SAUVEUR ET AL
COMPRESSED AIR BRAKE APPARATUS FOR MOTOR VEHICLES
Filed Feb. 1, 1924 9 Sheets-Sheet 9

Patented Dec. 27, 1927.

1,653,785

UNITED STATES PATENT OFFICE.

HARRY SAUVEUR, OF BERLIN-LANKWITZ, AND THEODOR KOLLINEK, OF BERLIN, GERMANY, ASSIGNORS TO HANDEL-MAATSCHAPPIJ H. ALBERT DE BARY & CO., OF AMSTERDAM, NETHERLANDS, A COMPANY ORGANIZED UNDER THE LAWS OF THE NETHERLANDS.

COMPRESSED-AIR BRAKE APPARATUS FOR MOTOR VEHICLES.

Application filed February 1, 1924, Serial No. 689,949, and in Switzerland November 15, 1923.

This invention relates to a compressed air brake apparatus for motor vehicles, in which in addition to its being possible to apply the brakes in the well known way to the back wheels, it is also possible, in special cases, to apply the brakes to the front wheels and at the same time to obtain an increased action of the brakes by strewing sand in front of the back wheels while the signalling horn is caused to sound. The invention also enables the action of the brakes to be regulated independently of the speed of rotation of the driving shaft, so that the maximum action of the brakes is ensured, without the injurious "scotching" of the wheels taking place, as when this does take place the maximum action of the brakes is already exceeded and there is risk of the side slipping of the vehicle together with an excessively high amount of wear and tear on the tyres. The apparatus forming the subject matter of this invention also enables the brake apparatus to be operated from the inside of the vehicle without the assistance of the driver, which is of special importance in cases of danger. Finally means are provided according to the present invention for automatically coupling a mechanical brake apparatus to the operating levers for the compressed air apparatus should there be any lack of air pressure in this latter due to leakage which would render the action of the compressed air brake apparatus doubtful.

The invention is illustrated in the drawings.

Figure 1 shows diagrammatically a motor vehicle fitted with the brake apparatus according to the present invention.

Figure 2 shows the arrangement of a brake power regulator which regulates the action of the brakes independently of the number of revolutions of the driving shaft. This apparatus is seen from the rear end of the vehicle.

Figure 3 is a plan of the parts shown from the rear in Figure 2.

Figure 4 shows in vertical section the internal arrangement of the brake power regulator mounted on the driving shaft.

Figure 5 shows a horizontal section through the brake power regulator.

Figure 6 shows this apparatus in elevation.

Figure 7 shows the driver's valve of the brake apparatus in elevation. This valve serves to produce the charging of the brake cylinder and the other apparatus connected therewith and also the emptying thereof.

Figure 8 is a vertical longitudinal section through the driver's valve.

Figure 9 is a transverse section on the line 9—9 of Figure 8.

Figure 10 is a horizontal section on the line 10—10 of Figure 9.

Figure 11 is a vertical transverse section through the valve on the line 11—11 of Figure 8.

Figure 12 is a longitudinal section through the valve, which meets the air supply passage through which the compressed air passes from a reservoir to the casing of the driver's valve.

Figures 13 to 16 are sections through the rotary valves in the driver's valve and in the different positions which these valves are capable of assuming relatively to each other and to the valve seat, the circular valves being supposed to be cut open and unrolled or developed.

Figure 17 shows the pedal for operating the brake valve in the driver's valve.

Figures 18 and 19 show the co-operation of the brake power regulator with the pedal for the releasing valve in the driver's valve.

Figure 20 shows a modified form of the pedal system in which the brake valve in the driver's valve is alone under the influence of the pedal while the releasing valve is subjected to the action of the brake power regulator only.

Figure 21 is a front elevation of the system of levers shown in Figure 20.

Figures 22 and 23 show the rotary valve in the releasing and brake positions, which is slightly modified in form when used with this system of levers.

Figure 24 shows another simplified constructional form of the system of levers in the releasing position and which offers advantages to be referred to hereafter.

Figure 25 shows the same system of levers in the cut-off position.

Figure 26 shows them in the brake position in dotted lines in the emergency stop position.

Figure 27 shows another improved constructional form of the releasing valve in combination with the brake power regulator in the position of readiness of the brake.

Figure 28 shows this arrangement in the position of release.

Figure 29 shows an improved constructional form for the casing of the releasing valve.

Figure 30 shows in side elevation an automatic arrangement which is connected to the pedal system shown in Figures 24 to 26 and which automatically couples a mechanical brake apparatus to the compressed air brake apparatus when there is a lack of pressure therein.

Figure 31 shows the apparatus as seen from above.

Figure 32 is a longitudinal section through the apparatus.

Figure 33 shows another apparatus for coupling the mechanical brake apparatus when the compressed air apparatus fails to act.

Figure 34 shows a brake apparatus.

Figure 35 shows a front wheel brake in vertical transverse section.

Figure 36 shows in elevation the application of the brake cylinder to the shaft casing.

Figure 37 is a horizontal transverse section through the apparatus shown in Figure 36.

Figure 38 is a vertical longitudinal section through the apparatus shown in Figure 35.

Figure 39 shows the diagram of the front wheel brake in single lines on a smaller scale.

Figure 40 shows a vertical longitudinal section through a front wheel brake of a different construction longitudinally of the shaft.

Figure 41 is a horizontal transverse section through the brake casing.

Figure 42 shows the arrangement of the brake on the front axle.

Figure 43:
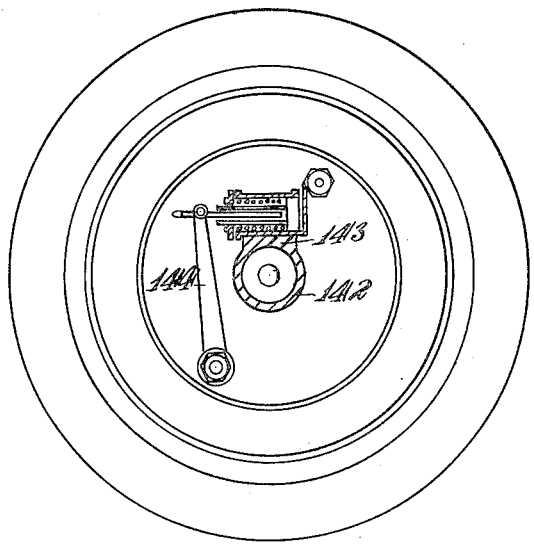
Figure 43 shows the arrangement of the back wheel brake in section seen from the side.

At a suitable point on the motor casing of the motor vehicle is mounted a compressor 1, which is driven in the well known manner off the motor shaft and draws in air by means of an exhauster 2 and forces it through the pipe 3 past a pressure regulator 4 of a well known kind and an oil separator built into the pipe if necessary, into the reservoirs 6 which are connected to each other. From one of the reservoirs a pipe 7 leads past a push button valve to the signal horn 9 and another pipe 7ª connects one of the reservoirs 6 with a driver's valve 11 which is screwed to the floor of the vehicle and for the operation of which the two pedals 12 and 13 are provided. The lever 12 is the brake lever and the lever 13 is the releasing lever. To this latter is attached a cord 14 which leads over guide rollers 15 to a brake power regulator 16, which is mounted on the motor shaft. 17 is the usual clutch for connecting the motor shaft to the driving shaft for the wheels which can be thrown into and out of action in the well known way by the pedal 18. When an emergency stop is made by the compressed air brake apparatus, this clutch can be automatically released without the assistance of the driver. From the driver's valve 11 a pipe 19 leads to the brake cylinders 20 of the back wheel brake. Another pipe 21 leads to the sanding apparatus 22, which is arranged in front of the back wheels. From the last named pipe branches off a pipe 23 which leads to the signalling horn 9. A pipe 24 leads from the driver's valve 11 to the brake cylinders 25 of the front wheel brakes.

The brake pressure regulator 16 consists of a supporting arm 27 which is fixed by wedges on the driving shaft 26 and to the ends of which two centrifugal weights 28 are attached by means of bolts 29. Tension springs 30 tend to constantly draw the centrifugal weights inwards. These weights are placed inside a brake drum 31 which is pushed loosely on to the shaft 26 and against which two brake blocks 33 subjected to the action of lightly stressed springs 32 bear from outside. The springs 32 can be regulated by tension screws 34. All these parts are enclosed in a casing 35, which is carried and rotates loosely on the hub of the loose brake drum 31. Projections 36 hold the brake blocks 33 immovably in position relatively to the casing 35. A screw cover permits the interior of the casing 35 to be filled with oil so that the brake pulley 31 always runs in oil. In the casing 35 is cut a hollow gutter or groove 38, in which lies a cord 14 which leads from the brake power regulator to the lever of the driver's valve 11, by which the releasing valve is operated. The cord 14 is connected by means of a swivel and a screw passed through it to the brake power regulator. To this latter is attached a screw 39, which is adapted to slide in a slot in a rod 40, which is attached to the rotary bearing 41. In this way the throw which the pressure regulator casing can describe and consequently the movement of the cord 14 are limited. One end of this latter is attached to the lever 43, which is connected by means of the rod 44 provided with a longitudinal slot (see Figures 18 and 19) to the pedal 13. The rod 44 is attached to the stud 45 provided on the lever 43.

The arrangement of the driver's valve is shown in Figures 7 to 16. The driver's valve casing or the lower portion of it is secured by means of the screws 46 to the floor of the vehicle. The part 47 has all the pipe connections (see Figure 11). To it, is rigidly connected the valve seat 48 with the interposition of a packing disc or washer. Directly on the rotary valve seat 48 lies the releasing valve 49 and above this the brake valve 50. This latter is connected by a polygonal pin clutch to a shaft 51 on which is mounted the lever arm 52, which is connected by means of a connecting rod 53 to the pedal 12 (see Figure 17). The pedal 12 serves therefore to operate the brake rotary valve 50, and the pedal 13 to operate the releasing valve 49. A bell-shaped portion 54 shuts off the interior of the driver's valve airtight from the outer air. The bell-shaped casing 54, the valve seat 48 and the lower portion 47 of the valve are held together by screws 56. The rotary releasing valve 49 is mounted fast on the hollow shaft 55. Through the passage 7ª compressed air passes from one of the air reservoirs 6 (see Figure 1) into the valve casing and passes through the passage 57 past the rotary brake valve 50 and presses this latter firmly down upon the rotary releasing valve 49. The passage 58 is connected by the pipe 24 to the brake cylinder 25 of the front wheel brake (see Figure 1). The passage 59 is connected by the pipe 19 to the brake cylinder 20 for the back wheels. The passage 60 is connected by the pipe 21 to the sanding apparatus 22 and by the branch pipe 23 to the signal horn 9.

When the vehicle is stationary and the brakes are off the rotary valves in the driver's valve assume the position shown in Figure 16. The compressed air which passes into the casing of the driver's valve through the passages 7ª and 57 passes through the passage 61 and the passage in the releasing valve underneath it to the valve seat 48. Compressed air also passes through the coinciding passages 62 and 66 and 64 and 68. The passage 58 is connected by the hollow space 65 in the releasing valve 49 with the interior of the hollow shaft 55, (see Figure 8) and therefore with the outer air, that is to say the front wheel brake is emptied of air and taken off. The same holds good in respect of the back wheel brake, as the passage 59 communicates across the hollow space 67 also with the interior of the shaft 55 which leads to the outer air.

When the vehicle begins to move, the supporting arms 27 of the brake power regulator which are mounted on the driving shaft 26 rotate, and the centrifugal weights pivoted to them are slung outwards by centrifugal force against the action of the springs 30 and bear against the inner edge of the pulley 31. After a short time this will be carried along by the centrifugal weights 28. It is coupled to the shaft 26 by the centrifugal force of the centrifugal weights. As the brake blocks 33 bear lightly against the outside of the edge of the pulley 31, they will likewise be carried along by it and will in their turn transmit the rotary movement by the projections 36 to the brake power regulator casing 35. This latter therefore performs a rotary movement so far as the slot in the rod 40 permits of it. The cord 14 is pulled by the brake power regulator and transmits its movement to the lever arm 43. During this movement its stud 45 slides in the slot in the rod 44. The lever arm 43 rotates the hollow shaft 55 of the driver's valve 11 and thus causes the movement of the releasing valve 49, which moves out of the position shown in Figure 16 into the position shown in Figure 13 which may be termed the "readiness for action of the brake" position. The passages 58 and 59 which communicate with the brake cylinders now coincide with the passages 66 and 68 in the releasing valve 49. The passage 60 which leads to the sanding apparatus and the signal horn coincides with the passage 69 in the releasing valve. Only in this position of the releasing valve is it possible to apply the brakes to the vehicle by means of the compressed air brake, which is done by depressing the brake pedal 12 which is shown in Figure 17 at I in the off position, at II in the position for an ordinary application of the brakes and at III in the emergency position. It transmits its movement by means of the connecting rod 53 to the lever 54 and consequently to the rotary brake valve 50. For the purpose of an ordinary application of the brakes the lever 12 is moved out of position I into position II. The rotary valve 50 then moves out of the position shown in Figures 13 and 16 into the position shown in Figure 15. The passage 63 places itself over the coinciding passages 58 and 59 and the compressed air flows through the said passage connection and the attached pipe 19 into the brake cylinder of the back wheel brakes. This flow of the compressed air over into the brake cylinder takes place gradually, as the passage 63 is small. The front wheels continue to rotate without having the brakes applied to them. If now the pedal 12 be released, it flies back into position I under the action of the spring 70 as shown in Figures 17, and consequently the rotary brake valve 50 moves back again into the position shown in Figures 13 and 16, while the valve 49 remains in the position shown in Figure 15. The driver's valve is then in the cut-off position. Once it has been initiated the action of the brake persists, presuming that it is not interfered with by leakage in the brake cylinder or the pipe which connects it with the driver's valve.

When an emergency stop is initiated the lever 12 is brought into position III (see Figure 17). The rotary valve 50 now assumes the position shown in Figure 14. On its way out of the position shown in Figure 13 into the position shown in Figure 14 it has to pass over the position shown in Figure 15, which means that firstly the passages 63, 68 and 59 also supply throttled compressed air to the back wheel brakes which are at first applied lightly. Only after this has taken place does the valve 50 pass into the position shown in Figure 14, in which not only the back wheel brakes now receive compressed air in copious quantities through the passage 62, but the brake cylinders of the front wheel brakes are also copiously supplied with compressed air through the connection 61, 66, 58. so that both brakes are applied rapidly. In addition to this, compressed air passes through the passages 64, 69 and 60 to the pipes 21 and 23 leading to the sanding apparatus and the signalling horn.

If the valve 50 be moved back into the position shown in Figure 13 the action of the brakes on the front and back wheels will be maintained, but the sanding apparatus will be shut off and the current of air to the signal horn will be cut off.

The co-operation of the brake pressure regulator when the brake is applied is as follows:—

When the vehicle is stationary, the centrifugal weights 28 are drawn together by the springs 30, and the cord 14 does not pull on the lever 43. The lever 13 is drawn by the spring 71 attached to it into the position a, see Figure 18, and the valve 49 connected with it assumes the position shown in Figure 16, which corresponds to the position of the lever 43 in Figure 18 into which this lever is moved by the spring 72 attached to it. If the driving shaft begins to rotate and the cord 14 is tightened by the action of the brake power regulator carried along by the driving shaft, the lever 43 will be moved against the action of the spring 72 out of this position into the position whereby the valve 49 passes into the position of readiness for action of the brake shown in Figure 13. If now an application of the brakes has been initiated and the valve 50 has been brought back into the shut off position shown in Figure 15 after the action of the brake has begun, the number of revolutions of the driving shaft 26 will decrease more and more owing to the action of the brake. Finally it will be so small that the centrifugal force of the centrifugal weights 28 of the brake power regulator is no longer sufficient to overcome the tension of the springs 30. The weights 28 will be drawn away from the edge of the pulley 31, this latter and the casing of the brake power regulator will consequently be no longer coupled to the shaft 26, and the spring 72 will draw the lever 43 into the position shown in Figure 19. The releasing valve 49 passes into the position shown in Figure 16, the compressed air escapes from the brake cylinders, the wheels to which the brakes have been applied can again rotate at full speed, centrifugal force acts again on the weights 28 flings them again against the pulley 31 and a pull is once more exerted on the cord 14 which brings the lever 43 into position. The rotary valve 49 again moves into the position shown in Figure 13, and when the valve 50 is moved into one of the positions shown in Figure 14 or Figure 15 the brakes are again applied, and if they had been applied a fresh application would take place at once. In this way the power of the brake regulates itself automatically in such a way that the maximum action of the brake is secured without the wheels slipping.

If the weights 28 of the brake pressure regulator 16 were to act directly on the casing 35, the result would be that on an increase in the number of revolutions of the shaft 26 very great heating of the casing would ensue, and furthermore the force which carries the casing along would depend on the speed at which the vehicle was traveling, and would therefore vary constantly. By the interposition of the pulley 31 however the centrifugal force is taken off this, which after a few revolutions of the shaft 28 is coupled to the latter by friction, and only the frictional resistance produced by the constant slight pressure of the brake blocks 33 has to be overcome, which only causes slight heating as the pulley 31 always runs in oil.

From the above description it will be seen that the vehicle can have the brakes applied to it only up to a certain small minimum speed, because as the speed diminishes the centrifugal force of the weights 28 of the brake power regulator disappears more and more, so that finally the pull on the cord 14 ceases before the vehicle stops and the valve 49 passes into releasing position. On a level track the vehicle would come to a standstill very soon owing to the resistance to progression and its own resistance, but on a gradient the vehicle could be stopped with the above mentioned means. To render this possible the pull on the cord which brings the releasing valve into the position of readiness for application of the brake must be brought about by special means when the vehicle is moving at a low speed, or is stationary. This is done according to the present invention by the lever 73 to which two rollers 74 and 75 are attached one of which lies above and the other below the centre of rotation of the lever, see Figures 18 and 19. Ordinarily the lever 73 assumes the position shown in Figure 19. If the vehicle to which the brakes have been applied has nearly come to a standstill, and if the action of the brake power regulator has already ceased owing to the decrease of the centrifugal force, the lever 73 will be moved into the position shown by dot and dash lines in Figure 19 for the purpose of stopping the vehicle. In consequence of this the lever 43 will be brought into position and the brake releasing valve into the position shown in Figure 13. By repeated short depressions of the lever 12 and its return to the shut-off position the brakes remain applied to the vehicle, until by releasing the lever 12 the releasing position is brought about.

Another arrangement of the pedal is shown in Figures 20 to 22. In the previously described arrangement of the levers the driver is compelled, when the brakes are applied and taken off in rapid succession, to place his foot first on one and then on the other of the separate levers 12 and 13. With this arrangement of the levers it may happen that the driver's foot after being lifted from one lever may not at once pick up the other lever but may grope round, and this may easily happen if any incidents on the road in front of the driver divert his attention from the operating levers for the brake apparatus. At moments when everything depends on rapid action this may be serious. In the constructional form of the levers shown in Figures 20 to 22 this possibility is obviated by making both levers oscillate about the same rotary bearing so that they can be simultaneously operated by one and the same foot. In this arrangement the brakes can be applied and taken off in direct succession without any loss of time. In this arrangement the movement of the releasing valve in the driver's valve is effected solely by the cord of the brake power regulator. This valve is therefore no longer coupled by a connecting rod to one of the pedals. Consequently a slightly altered construction of the rotary valve in the driver's valve is necessary.

Figure 20 shows the arrangement of levers from the side, Figure 21 from the front, Figure 22 shows the valve of the driver's valve in the release position and Figure 23 shows it in the shut-off position. As in the previously described constructional form the brake pedal $12^a$ is attached by the connecting rod 53 to the lever 52 by which the rotary brake valve $50^a$ of the driver's valve is moved. The lever $12^a$ is acted on by the powerful tension spring $70^a$ which tends to draw it always against the stop 77. The lever $13^a$ oscillates with the lever $12^a$ about the rotary bearing 76 common to both. The movement of the brake pedal $12^a$ in the direction which applies the brakes is limited by the spring stop 78 which indicates to the driver when the brake pedal has assumed the position corresponding to an ordinary application of the brakes and the transition to the emergency stop takes place. The lever $13^a$ is acted on by a tension spring 79, which is weaker than the spring $70^a$, and serves to draw the lever $13^a$ with its stop 82 against the lever $12^a$ until the lever $13^a$ has reached the front of the stop 77. If both levers are unloaded, they assume the position marked I in Figure 20 and the brake valve $50^a$ is in the release position, see Figure 27. It is assumed here that the vehicle is in motion and the releasing valves $49^a$ is moved by the cord into the position of readiness for action of the brake. The valve cavities $65^a$ and $67^a$ which communicate by the hollow shaft 55 in the driver's valve with the outer air communicate by the passages $80^a$ and 81 in the releasing valve $49^a$ with the passages 58 and 59 which lead to the brake cylinders for the front and back wheels. The brake cylinders are emptied, the brakes are off. If the foot, as is normally the case when running, be placed on both levers, both will go down; lever $13^a$ will bear against the stop 77 and lever $12^a$ will move into position II. In consequence thereof the valve $50^a$ will be brought into the cut-off position shown in Figure 23. In this position the brakes remain released, if they were released, and they remain on if they were on. The connection of the passages leading to the brake cylinders with the open air is interrupted, likewise that with the space above the rotary brake valve $50^a$. If any ordinary stop or an emergency stop is to be initiated, the lever $12^a$ will be brought into position III or position IV, and the lever $13^a$ remains in contact with the stop 77. The ordinary and emergency positions of the valve $50^a$ will be seen at once from a glance at Figures 22 and 23. If the brakes are to be taken off after they have been applied, the driver of the vehicle removes his foot from both levers, which at once return to position I as shown in Figure 20, and the valve $50^a$ again assumes the release position shown in Figure 22. When the vehicle has been stopped or when it is only moving slowly the necessary pull on the cord to operate the valve $49^a$ is again effected by hand through the lever 73.

Another possible construction of the brake pedal is shown in various positions in Figures 24 to 26 which in comparison with the one last described offer the advantage that the foot has only one lever to operate. The use of two levers to be operated by the foot involves both levers changing their distance from each other when moved, so that the foot slips on the levers, and this may lead to its slipping right off. In the arrangement of the levers shown in Figures 24 to 26 this is not possible, because the foot has only one lever to operate. In this arrangement two levers 12ᵇ and 13ᵇ are used as before and rotate about a common rotary bearing 76. The lever 13ᵇ is connected to the lever 12ᵇ by a spring 83. Figure 24 shows the system of levers in the released position and Figure 25 in the shut-off position. Figure 26 shows them in the position for an ordinary application of the brakes and in dotted lines for the emergency stop. In the position shown in Figure 24 the spring 70ᵇ draws the lever 12ᵇ towards the right and at the same time bears against the stop 82ᵃ provided on the lever 13ᵇ and carries the lever 13ᵇ with it until it bears against the stop 84 which is placed inside the free space formed by the lever 13ᵇ and a hook-shaped downwardly extending stop 85 mounted thereon. If the lever 12ᵇ be brought into the position shown in Figure 26 the brake valve in the driver's valve assumes the shut-off position. This position is indicated to the driver by the fact that the stop 85 on the lever 13ᵇ is bearing against the stop 84, and in consequence of the tension of the spring 83 the lever 12ᵇ still remains in contact with the stop 82ᵃ on the lever 13ᵇ. Only when the lever 12ᵇ is further depressed for the purpose of applying the brakes does it lift from the stop 82ᵃ on the lever 13ᵇ. As soon as it strikes against the stop 86, see Figure 26, the position for the ordinary application of the brakes is reached. If the spring stop 86 be depressed by the lever 12ᵇ until this latter bears against the fixed stop 87 then the emergency stop position is reached. On pulling back the lever 12ᵇ the shut-off position is indicated to the driver by the fact that the lever 12ᵇ again strikes against the stop 82ᵃ, and at the same instant the co-operation of the spring 83 when the lever 12ᵇ is drawn back ceases, because both levers are from this moment in a way rigidly coupled to each other.

As in the arrangement shown in Figures 2, 3, 7 to 16 and 22 and 23, it has to be taken into consideration that the two rotary valves, which are superposed on each other and are pressed together by spring pressure and the pressure of the compressed air bearing on the brake valve, offer a considerable frictional resistance to their movement, which makes very powerful springs necessary for the return movement of the valves, an arrangement is provided according to another part of this invention which is shown in Figures 27 to 29, and in which the releasing valve is mounted separately from the brake valve in a separate casing.

Figure 27 shows the arrangement in the position which it assumes while the vehicle is in motion, that is to say when the brake power regulator is in operation. Figure 28 shows the arrangement in the released position. Figure 29 shows a modification which offers an advantage to be hereinafter described. The apparatus works as follows:—

Above the rotary brake valve (not specially shown) is compressed air of the pressure which exists in the reservoir. As soon as the wheels of the vehicle begin to revolve, the cord 14 is tensioned by the brake power regulator, and rotates the lever 43ᵃ, see Figure 27, against the action of the spring 72ᵃ, into the position shown in Figure 27. This rotation of the lever 43ᵃ is transmitted through the shaft 88 and the lever 89 to the flat valve 90, which then connects the passages 91 and 92. The arrangement is now in the position of readiness for action of the brake. If the brakes be now applied by the rotary brake valve in the driver's valve, the compressed air flows through the passage 91, the cavity 93 in the valve 90, and the connection 92 into the brake cylinders, and allows the brake to act. The valve 90 has a passage 94 in it. On the back of the valve is mounted a ball 95, which is lightly pressed by a pivoted arm 96 against the valve seat, the free end of the lever 96 having attached to it a spring 97, the tension of which can be regulated by a screw 98. In the walls of the valve casing are formed the passages 99 which connect the interior of the valve casing with the open air. If the action of the brakes has become so powerful that the wheels only rotate slowly, the tension produced by the brake power regulator 16 on the cord 14 decreases in the manner above described, and the spring 72ᵃ rotates the lever 43ᵃ into the position shown in Figure 28. The valve 90 then closes the mouth of the passage 91 and places itself with the passage 94 over the opening of the connection 92, and the pressure in the brake cylinder escapes into the open air through 92, 94 and 99. The brakes are taken off, the rotation of the shaft increases according to the velocity at which the vehicle is moving, the brake pressure regulator again attracts the cord 14, and a fresh application of the brakes takes place. In practice the action of the brakes will so adjust itself that any slipping of the wheels will still be avoided. The arrangement shown in Figures 27 and 28 does not, however, permit the vehicle to be brought to a complete standstill directly, as the air in the brake cylinders escapes so slowly even when the vehicle is moving, that the centrifugal force is no longer sufficient to bring about the coupling between the brake pulley in the brake power regulator and the driving shaft. In order therefore to bring the vehicle to a complete standstill by means of the compressed air brake apparatus, the arrangement shown in Figure 29 is provided on the casing of the releasing valve. This arrangement consists of a spring-loaded retaining valve 100. When the valve 90 is moved into the release position in this arrangement, the pressure in the brake cylinder which fills the valve casing through the passage 94 lifts the valve 100 against the action of the spring 101, and escapes through the openings 99, until the pressure is so much reduced that it is overcome by the power of the spring 101. As soon as this has taken place, the valve 100 closes, and the slight pressure remaining in the brake cylinder and the spaces in communication therewith is sufficient to bring the vehicle to rest. The spring 101 can be regulated by the screw 102.

As when the compressed air brake apparatus fails to act owing to lack of pressure, the brakes must be applied, in any case when the brake pedal is operated, in order to avoid an accident, there is provided in addition to the compressed air brake apparatus a mechanical brake apparatus of any known construction, which is dependent on the compressed air brake apparatus in such a way that it is automatically coupled to the operating levers for the air brake when lack of pressure occurs in this latter. Such an arrangement is shown in Figures 30 to 32. The lever arrangement corresponds with that shown in Figures 24 to 26, but the previously described lever arrangements also may obviously be used. The levers $12^b$ and $13^b$ are mounted on a sleeve 103. The lever $12^b$ is rigidly connected by means of a wedge with this sleeve, see Figure 32, while the lever $13^b$ rotates loosely on the sleeve. This latter is pushed loosely on to a shaft 104. A second sleeve 105 is so mounted on the shaft 104 that it can take part in its rotary movement and also move along it longitudinally, which is rendered possible in the usual way by putting a key inside the sleeve 105 which works in a key way or groove in the shaft 104. The shaft rotates in the bearings 106 and 107. At one end is keyed an arm 108 to which a cord 109 is attached, which leads to the mechanical brake apparatus. A stop 110 limits the movement of the arm 108. The adjacent ends of the sleeves 103 and 105 are each toothed as shown in Figures 31 and 32, whereby a coupling connection is provided between the two sleeves, and consequently a coupling connection between the shaft 104 and the lever $12^b$ also. In the periphery of the sleeve 105 is cut a groove in which the two diametrically opposite pins $110^a$ engage, which pins are mounted to rotate in a lever arm 11 which embraces the sleeve 105. This lever arm oscillates on a fixed rotary bearing 112, and is connected at its free end to the piston rod 113 of a small compressed air cylinder 114, which cylinder is connected by a three-way cock 115 to one of the pipes 116 constantly filled with compressed air. In the position of the cock shown in Figure 31 the spring 117 will bring the sleeve 105 into engagement with the sleeve 103 when there is a lack of compressed air, so that the movement of the pedal $12^b$ to put a brake on will be transmitted to the shaft 104, and consequently to the arm 108 and the cord 109, and the mechanical brake apparatus will act. The three-way cock enables the mechanical brake apparatus to be coupled with the pedal system at any time.

Another arrangement for the operation of the mechanical brake apparatus is shown in Figure 33. The brake pedal $12^c$ is mounted on a common shaft with a lever $13^c$. The lever $13^c$ forms a loop inside which the lever $12^c$ can move in such a way that it can assume all the positions necessary for the putting on and taking off of the compressed air brake apparatus, without the lever $13^c$ being touched. Only when the lever $12^c$ is moved over beyond the emergency stop position, when there is a lack of compressed air, does it bear against the inner side of the loop of the lever $13^c$ and carry it with it, so that a pull is exerted on the cord $109^a$ by which the mechanical brake apparatus is operated. When the lever $12^c$ returns to the release position, the lever $13^c$ will be drawn back by the spring $117^a$ until it touches the stop 118.

In order to enable the occupants of the vehicle to stop it in case of danger which has not been noticed by the driver, or not noticed quickly enough, and stop it independently of him, an emergency brake apparatus is provided, which is shown diagrammatically in Figure 34. This apparatus comprises a compressed air cylinder 119, the piston rod of which is not rigidly connected to the body of the piston, so that it can be moved independently thereof with the lever 12 to which it is pivoted. The compressed air cylinder 119 is connected to the source of pressure by a pipe 120, in which is a three-way cock 121 so arranged in the interior of the vehicle that it can be conveniently reached by the occupants. In the position of the cock 121 shown in Figure 34 the cylinder 119 is empty. If it be brought into a position in which the cylinder is connected to the source of pressure, the lever 12 will be brought into the brake position without any assistance of the driver of the vehicle.

The way in which the brake is arranged on the front wheels is shown in Figures 35 to 39 and 40 to 42.

In the first constructional form of the front wheel brake, two brake cylinders are provided for each of the two front wheels; these are pushed in on both sides of the axle by means of prism-shaped projections 123 into corresponding depressions in the axle 124 and are held in position by keys. In consequence of this arrangement, the brake cylinders can follow every movement of the wheels when they deflect. The entire brake apparatus is placed in a casing mounted on the wheel. The brake pistons 126 are controlled by releasing springs 127. They are attached by their piston rods to the free ends of one armed levers 128. At a slight distance from the centre of rotation of the lever 128 is attached a tie rod 129, which is attached to the longer end of a two-armed lever 130, to the shorter end of which lever is attached a brake block 131. The piston forces of the brake pistons 126 are therefore transmitted with double force of leverage to the brake pulley 132.

In the constructional form of the front wheel brake as shown in Figures 40 to 42 the brake cylinder is attached directly to the brake casing. The axle 133 has a forged-on collar 134 to which is riveted the pulley 135 which may conveniently be made of cast steel and which closes the brake casing. In the pulley is an opening for the cam shaft 136, which serves when applying the brake in the usual way to press the brake blocks 137 (Figure 40) against the inner edge of the brake pulley 138. A second opening in the pulley 135 serves to allow of the passage of the bolt 139 on which the brake blocks oscillate. On the pulley 135 is mounted the brake cylinder 140. It may be made in one piece with the pulley or be screwed or riveted thereto. The brake pulley 138 is rigidly connected to the hub of the wheel, see Figure 40.

Figure 44:
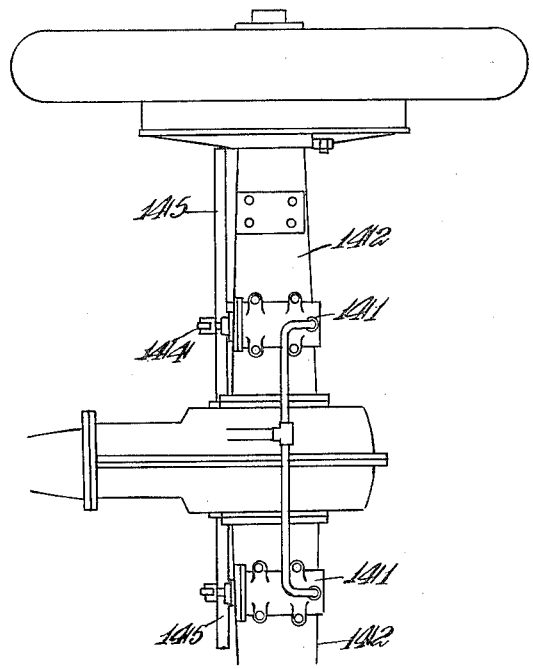
Figure 44 shows the corresponding view from above.

The arrangement of the brake cylinders for the back wheels may conveniently be that shown in Figures 43 and 44. The brake cylinders 141 are mounted on the axle tube 142 which is provided for the purpose with brackets. The brake levers 144 to which the brake piston rods are attached are fixed on the shaft 145 which is carried in the brake casing mounted on the back wheels, and acts in the usual way on the brake blocks.

What we claim and desire to secure by Letters Patent of the United States is:—

1. The combination with a motor vehicle including a compressed air brake system, a brake mechanism, a driver's control mechanism for controlling the flow of air thereto, and a brake power regulator controlled by the movement of said vehicle to actuate said control mechanism.

2. The combination with a motor vehicle including a compressed air brake system, a brake mechanism, a driver's control mechanism for controlling the flow of air thereto, and a centrifugal brake power regulator controlled by the movement of said vehicle to actuate said control means.

3. The combination with a motor vehicle including a compressed air brake system, a brake mechanism, a driver's control mechanism for controlling the flow of air thereto, a brake power regulator controlled by the movement of said vehicle to actuate said control mechanism, and manually controlled means for actuating said control mechanism to place the latter in readiness for application of the brake mechanism when the brake power regulator is inoperative.

4. The combination with a motor vehicle including a compressed air brake system, a brake mechanism, a driver's control mechanism including a brake valve and a release valve, a brake lever connected to the brake valve, a brake power regulator, spring means opposing the action of said regulator, and a spring retracted lever for operating said release valve and opposing said spring means.

5. The combination with a motor vehicle including a compressed air brake system, a brake mechanism, a driver's control mechanism including a brake valve and a release valve for controlling the flow of air thereto, a brake lever connected to the brake valve, a brake power regulator controlled by the movement of said vehicle to operate said release valve and regulate the degree of braking effect of said brake when said brake lever is actuated, and spring means opposing the action of said brake power regulator and normally urging said release valve into a position to exhaust air from the brake mechanism.

6. The combination with a motor vehicle including a compressed air brake system, front and rear air brakes included therein, a sanding apparatus and a signalling device included in the air brake system, a driver's control valve including relatively movable members having air passages, a conduit connecting said control valve with said rear wheel brakes, a second conduit connecting said control valve with said front wheel brakes, a third conduit connected with the control valve and the sanding apparatus and signalling device, means for operating the driver's control valve for successively opening said conduits in the order named, and said first and second named conduits remaining open and said third conduit being closed when the control valve is returned to normal position.

7. In a motor vehicle including a compressed air brake system, front and rear wheel brake mechanisms adapted to be successively operated, a driver's control mechanism for controlling the flow of air thereto, a brake power regulator controlled by the movement of the vehicle to actuate the control mechanism, a pair of conjointly operated levers for operating the control mechanism, said levers being simultaneously operated by movement of one lever, said levers having a different range of movement, and means indicating a position of one of said levers beyond which position the movement of the other lever causes application of the rear wheel brake mechanism.

8. In a motor vehicle including a compressed air brake system, front and rear wheel brake mechanisms adapted to be successively operated, a driver's control mechanism for controlling the flow of air thereto, a brake power regulator controlled by the movement of the vehicle to actuate the control mechanism, a pair of conjointly operated levers for operating the control mechanism, said levers being simultaneously operated by movement of one lever, said levers having a different range of movement, and means indicating a second position of said other lever beyond which position the movement of said other lever causes application of the front wheel brake mechanism.

9. In a motor vehicle including a compressed air brake system, front and rear wheel brake mechanisms adapted to be successively operated, a driver's control valve in said system, means for operating said driver's control valve, a release valve mechanism associated with the driver's control valve, an automatic brake power regulator for controlling said release valve mechanism, a slide valve in said release valve mechanism having connection with the brake power regulator, and means for decreasing the resistance of movement of said slide valve.

10. In a motor vehicle including a compressed air brake system, front and rear wheel brake mechanisms adapted to be successively operated, a driver's control valve in said system, means for operating said driver's control valve, a release valve mechanism associated with the driver's control valve, an automatic brake power regulator for controlling said release valve mechanism, a slide valve in said release valve mechanism having connection with the brake power regulator, and a spring controlled retaining valve associated with said release valve mechanism adapted to be operated when the brake mechanisms are released.

11. The combination of a motor vehicle including a compressed air brake system, a brake mechanism, a driver's control mechanism for controlling the flow of air thereto, means included in said control mechanism whereby various amounts of compressed air can be supplied to said brake mechanism, and a brake power regulator controlled by the movement of said vehicle to actuate said means to regulate the degree of braking effect of said brake mechanism when actuated by said driver's control mechanism.

12. The combination of a motor vehicle including a compressed air brake system, a brake mechanism, a driver's control mechanism for controlling the flow of air thereto, a release valve and a brake valve included in said control mechanism and having passages of different relative proportions, and a brake power regulator controlled by the movement of said vehicle to position said release valve in co-operative relation to said brake valve to regulate the degree of braking effect of said braking mechanism when actuated by said driver's control mechanism.

13. The combination of a motor vehicle including a compressed air brake system, a brake mechanism, a driver's control mechanism for controlling the flow of air thereto, a rotary release valve and a rotary brake valve included in said control mechanism and having their axes parallel to the direction of flow of the compressed air through said control mechanism, and a brake power regulator controlled by the movement of said vehicle to position said release valve in co-operative relation to said brake valve to regulate the degree of braking effect of said brake mechanism.

HARRY SAUVEUR.
THEODOR KOLLINEK.